United States Patent
Hodgkinson

(10) Patent No.: US 9,382,808 B2
(45) Date of Patent: Jul. 5, 2016

(54) MACHINE CAVITY SEAL

(71) Applicant: ROLLS-ROYCE PLC, London (GB)

(72) Inventor: Carl Hodgkinson, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/604,220

(22) Filed: Jan. 23, 2015

(65) Prior Publication Data

US 2015/0233261 A1 Aug. 20, 2015

(30) Foreign Application Priority Data

Feb. 20, 2014 (GB) .................................. 1403008.4

(51) Int. Cl.
F16J 15/16 (2006.01)
F01D 11/00 (2006.01)
F16J 15/08 (2006.01)

(52) U.S. Cl.
CPC ........... *F01D 11/005* (2013.01); *F16J 15/0887* (2013.01); *F16J 15/0893* (2013.01)

(58) Field of Classification Search
CPC ............................... F16J 15/46; B60J 10/0037
See application file for complete search history.

(56) References Cited

U.S. PATENT DOCUMENTS

| 4,658,847 A | 4/1987 | McCrone |
| 2003/0057655 A1 | 3/2003 | Chehab et al. |
| 2009/0230723 A1 | 9/2009 | Huang et al. |
| 2009/0320441 A1* | 12/2009 | Selder ........................ F02C 3/10 60/39.092 |
| 2011/0030380 A1 | 2/2011 | Widdle, Jr. et al. |
| 2011/0272890 A1* | 11/2011 | Selby .................... F01D 11/003 277/345 |
| 2012/0133175 A1 | 5/2012 | Charnesky et al. |
| 2013/0270777 A1 | 10/2013 | Clouse |

FOREIGN PATENT DOCUMENTS

| EP | 1002972 A1 | 5/2000 |
| GB | 2415471 A | 12/2005 |

OTHER PUBLICATIONS

Sep. 3, 2014 Search Report issued in British Application No. GB1403008.4.

Jul. 8, 2015 Search Report issued in European Application No. 15 15 2302.

* cited by examiner

Primary Examiner — Gilbert Lee
(74) Attorney, Agent, or Firm — Oliff PLC

(57) ABSTRACT

There is disclosed a seal assembly (32) for a machine such as a gas turbine engine. The seal assembly has a support structure (38) to which a resiliently deformable seal member (34) is mounted. A seal land (40) is oppositely spaced from the support structure (38) to define a gap therebetween, wherein the height of the seal member (34) in an undeformed condition is greater than the height (36) of the gap such that the seal member is deformingly pressed against the seal land (40) by the support structure to seal the gap therebetween in use. The support structure (38) and/or seal land (40) comprise an actuable member (40; 44; 46), said member being actuable in a direction towards the other of the support structure and seal land to improve the resistance of the seal assembly (32) to an adverse condition in use, such as a fire.

19 Claims, 4 Drawing Sheets

MACHINE CAVITY SEAL

CROSS-REFERENCE TO RELATED APPLICATIONS

This application is based upon and claims the benefit of priority from British Patent Application Number 1403008.4 filed 20 Feb. 2014, the entire contents of which are incorporated by reference.

BACKGROUND

1. Field of the Disclosure

The present disclosure relates to a seal for use in machines and more specifically, although not exclusively, to a seal for sealing between opposing walls of an internal cavity of a machine.

2. Description of the Related Art

FIGS. 1 and 2 show respectively a longitudinal section and three-dimensional view of a conventional gas turbine engine 10. The engine 10 comprises a core engine 12 and a nacelle 14 surrounding the core engine 12 and a propulsive fan 16. The space between the core engine 12 and the nacelle 14 defines a generally annular bypass duct 18 such that in use part of the airflow from the fan 16 enters the core engine 12 and the remainder passes along the bypass duct. A majority of the airflow along the bypass duct 18 flows directly aft to provide propulsive thrust.

The gas turbine engine 10 comprises a plurality of ventilation volumes, typically referred to as zones, created in the space between the engine, nacelle and bypass duct. The flow to/from those volumes is controlled by arrangements of inlets(s) and outlet(s) into the respective zones, or portions thereof. In this manner the flow rates from the bypass to the core of the engine for cooling and ventilation purposes are controlled. Three such zones are shown and labelled 20, 22 and 24 in FIGS. 1 and 2, in order to indicate zones conventionally referred to as zones 1, 2 and 3 of gas turbine engine 10. The inlets and outlets for each zone are labelled in FIG. 1 with the suffixes 'a' and 'b' respectively and arrows shows the general direction of flow through the zones in use. Flow from zone 3 may also pass into the turbine casing cooling manifold 26.

FIG. 2 shows the extent/length of the zones 20, 22 and 24 in the direction of the primary engine axis in use, i.e. about which the fan 16 rotates.

A sealing membrane is used between these controlled/enclosed air flow volumes (zones) or between these volumes and the bypass air flow to ensure control of ventilation flow and minimised uncontrolled leakage. The choice of seal is dependent on the height and/or possible variation in the gap to be sealed. That is to say, it has been found that the combined tolerances of the components forming an assembly to one, or either, side of the seal may vary from engine to engine, thereby causing a greater or small gap across which the seal must extend. This problem typically occurs for a radial gap, e.g. due to stacked tolerances on a radially inner side of the seal, but could equally apply for an axially extending gap in other configurations.

An example of one such seal 28 is shown in FIG. 3, in which an undeformed seal profile 28a is shown in FIG. 3a. FIGS. 3b and 3c show the varying degrees of compression that must be accommodated by the seal 28 in a normal or maximal gap height in FIG. 3b or a minimal gap height (maximal compression state) in FIG. 3c.

However the compressibility of the seal to accommodate different gap heights is only one engineering consideration. The design of a suitable seal is complicated by the need to also be able to prevent a fire destroying or otherwise crossing the seal. This safety requirement is particularly important in gas turbine engines to prevent flames propagating from the engine core 12 casing or nacelle 14 interior into the bypass 18.

In order to reduce the susceptibility of the seal to fire damage a flame shield 30 may be provided adjacent the seal 28 as shown in FIGS. 3b and 3c. However the flame shield 30 of FIGS. 3b and 3c is designed for a minimal gap height (i.e. a maximum seal compression condition) since an optimum design at minimum compression condition may result in non-acceptable wear or contact loads at maximum compression. The limitation of the extent of the flame shield 30 thus results in it being of varying effectiveness between different engines of the same type.

This compromise therefore exposes seals 28 in low or normal compression states to an increased risk of possible fire damage. However the gap height is unknown prior to assembly and so there is no satisfactory way of guarding against this risk using conventional seal arrangements other than to increase the size and/or stiffness of seal membranes beyond that which would be optimal for normal operation. This problem is compounded by the possibility of relative deflections in use and the degree of seal compression being critical to fire resistance capability.

OBJECTS AND SUMMARY

It is an aim of the present disclosure to provide a seal assembly which mitigates one or more of the above discussed problems. It may be considered an additional or alternative aim of the disclosure to provide a seal assembly for which the seal consistency and/or resistance to adverse conditions is improved.

According to a first aspect there is provided a seal assembly comprising a support structure to which a resiliently deformable seal member is mounted and a seal land opposingly spaced from the support structure to define a gap therebetween, wherein the height of the seal in an undeformed condition is greater than the height of the gap such that the seal member is deformingly pressed against the seal land by the support structure to seal the gap therebetween in use, wherein the assembly comprises an actuable member mounted to one of the support structure and seal land, said member being actuable in a direction towards the other of the support structure and seal land to improve the resistance of the seal assembly to an adverse condition in use.

The actuable member may comprise a protective wall arranged to one side of the seal member. The wall may depend from the support structure or seal land at least part way across the gap towards the other of the support structure and seal land in use. The protective wall may be actuable to shield the seal, for example in the event of adverse conditions, which could jeopardise the integrity of the seal.

The wall may be perpendicular or obliquely angled in normal operation or else in the at-rest condition relative to the gap height.

In any embodiment the actuable member may or may not take the form of an actuable wall. The actuable member may have a first (or at-rest) condition and a second (or actuated) condition. The actuable member may contact the other of the support structure and seal land in the second/actuated condition.

The actuable member may be reversibly and/or selectively actuable towards the other of the support structure and seal land.

The actuable member may be actuable so as to alter the angular orientation of the wall, for example relative to a height of the gap (e.g. a direction spanning the gap or a direction of minimum length/height between the support structure and seal land). The member may be pivotably actuable about a corner/apex in the member or else between the actuable member and the one of the support structure and seal land from which the member depends.

The actuable member may be deformable (e.g. reversibly deformable) towards the other of the support structure and seal land to shield the seal in use.

The actuable member may be self-actuable for example in response to one or more environmental or applied stimulus. The actuable member may comprise a material, the internal stress/strain of which is variable in response to one or more stimulus, such as temperature or electrical charge.

The actuable member may comprise a shape memory material, such as a shape memory metal/alloy.

The actuable member may or may not comprise a heat and/or flame shield. The actuable member may comprise a wall, which may be curved in profile/plan and/or annular in form (e.g. comprising a portion of, or a whole of, an annulus). The actuable member may extend in a circumferential direction about an axis.

The wall may be curved, angled or otherwise profiled in section, for example in a direction away from the seal member in use.

The actuable member may comprise a seal actuator. The seal actuator may be arranged to selectively compress the seal member. The seal actuator may be arranged to compress the seal member towards the seal land or support structure in use. The seal member may be mounted to the seal actuator. The actuator may help improve the resilience to fire of the seal by compressing the seal. The seal actuator may be mounted to the support structure.

In one example the seal assembly may comprise a plurality of actuable members. A first actuable member may comprise a protective wall and a second actuable member may comprise a seal member actuator.

A length of overlap between the support structure and seal land may be defined. The seal member may be located within said length of overlap.

The seal may be located adjacent a terminal edge or end of the support structure and/or land. The support structure and seal land may extend towards their respective end in opposing directions, e.g. substantially parallel but opposing directions. The, or each, direction may be substantially perpendicular to the gap height.

Either of the support structure or land may comprise a lip at its free end. The lip may face, or turn away from, the wall.

The seal land may comprise a recess or corner in which the seal member is received, e.g. towards a free end thereof. The seal land may comprise a first portion which may be substantially flush with an exterior surface of the opposing support structure. The seal land may comprise a second portion against which the seal member abuts in use. The second portion may be offset from the first portion, for example by an intermediate portion. The first, second and/or intermediate portions may comprise wall portions. Additionally or alternatively, the support structure may comprise any or any combination of said recess or corner features.

The seal member may be elongate in form. The seal member may have a cross-sectional profile that is, at least in part, oblique to the seal height. The seal member may have a cross-sectional profile that is, at least in part concave, recessed or convex (e.g. bulbous) relative to the seal height. The seal profile may be opposingly concave and convex about its periphery and/or may be shaped to define one or more interior angle on an external surface thereof (e.g. an overhang or crease).

The seal member may be hollow. An outer wall of the seal member may be substantially continuous about its periphery in section so as to completely enclose an interior of the hollow seal.

The seal member may be generally omega or keyhole shaped in section.

Any or any combination of the support structure, seal member and/or seal land may be annular in form. The gap may be an annular or circumferential gap. The gap height may be in a substantially radial direction. The seal may be mounted to the support structure, which may be radially inside the seal land.

The seal assembly may be arranged between a radially internal assembly and a radially outer casing or nacelle. The seal land may be on the casing or nacelle.

The seal assembly may be an internal volume or zone seal assembly, for example defining a seal for an internal cavity or housing. The internal volume may be to one side of the seal. The seal assembly may seal the interior volume from the exterior or else form a further interior volume on the other side of the seal member.

The seal assembly may comprise a gas/air seal assembly. The seal assembly may comprise a ventilation seal assembly, for example to inhibit gas/air flow passed the seal into a controlled-ventilation volume or zone.

The seal assembly may be a machine seal assembly, such as for use in a rotating machine or axial flow machine. The seal assembly may be a motor or engine seal assembly, e.g. for a rotor assembly. The seal may be for a gas path in any such machine or engine.

The seal assembly may be provided in a gas turbine engine, for example for sealing an internal volume from gas path in or through the engine. The seal assembly may be provided in the nacelle or engine casing of the engine. The seal assembly may be located between a bypass duct of the engine and an interior volume of the nacelle or engine casing. The support structure and/or seal land may comprise a wall of the bypass duct or nacelle.

A seal assembly may allow the overall volume to be optimised with potential aero dynamic, weight and/or cost benefits due to the ability to design within a smaller design volume because of reduced seal size required to meet minimum compression for fire integrity.

According to a second aspect, there is provided a seal assembly support structure, comprising a support member to which a resiliently deformable seal member is mounted, the support member arranged to be opposingly spaced in use from a seal land to define a gap therebetween, wherein the height of the seal in an undeformed condition is greater than the height of the gap such that the seal member is deformingly pressed against the seal land by the support member to seal the gap therebetween in use, wherein the support structure comprises a protective wall arranged to one side of the seal member said wall depending from the support member at least part way across the gap towards the seal land in use, said wall being actuable towards the seal land to shield the seal.

According to a third aspect, there is provided a seal assembly comprising a support structure to which a resiliently deformable seal member is mounted and a seal land opposingly spaced from the support structure to define a gap therebetween, wherein the height of the seal in an undeformed condition is greater than the height of the gap such that the seal member is deformingly pressed against the seal land by the support structure to seal the gap therebetween in use, wherein the assembly comprises an actuable member depending from one of the support structure and seal land at least part way across the gap towards the other of the support structure and seal land, said actuable member being actuable towards the other of the support structure and seal land to improve the resilience of the seal member to an adverse condition in use.

According to other aspects, there is provided an axial flow machine or gas turbine engine comprising an internal cavity and a seal assembly or support structure according to any preceding aspect for sealing said cavity. According to another aspect there is provided nacelle or engine casing comprising a seal assembly or support structure according to any preceding aspect.

Wherever practicable, any of the preferable features defined in relation to any one aspect of the invention may be applied to any further aspect. Accordingly the invention may comprise various alternative configurations of the features defined above.

BRIEF DESCRIPTION OF THE DRAWINGS

Practicable embodiments of the invention are described in further detail below by way of example only with reference to the accompanying drawings, of which.

DETAILED DESCRIPTION

The examples to be described below are intended for use to seal ventilation zones in gas turbine engines of the kind described above in relation to FIGS. 1 and 2. Accordingly any of the above description of those figures may be applied to examples of the invention. However the invention may also be applied in other kinds of machinery, particularly where there exists a need to be able to simply and reliably protect an elongate seal against adverse conditions, such as fire. The arrangement is particular suited to annular gas seal scenarios for internal machine compartments but need not be exclusively limited thereto.

Figure 1:
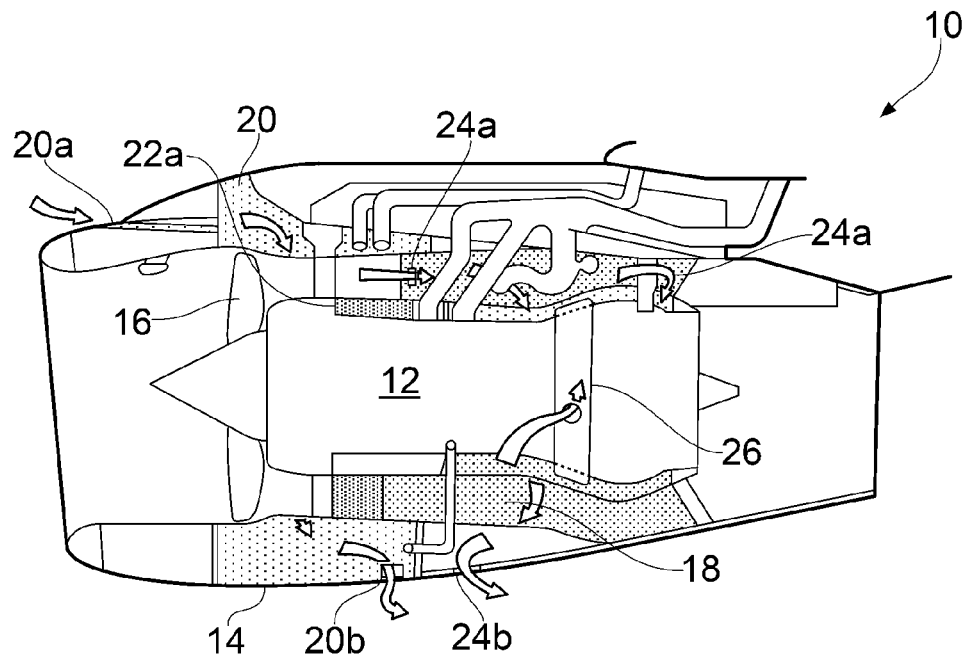
FIG. 1 shows a longitudinal section through a gas turbine engine according to the prior art.
Figure 2:
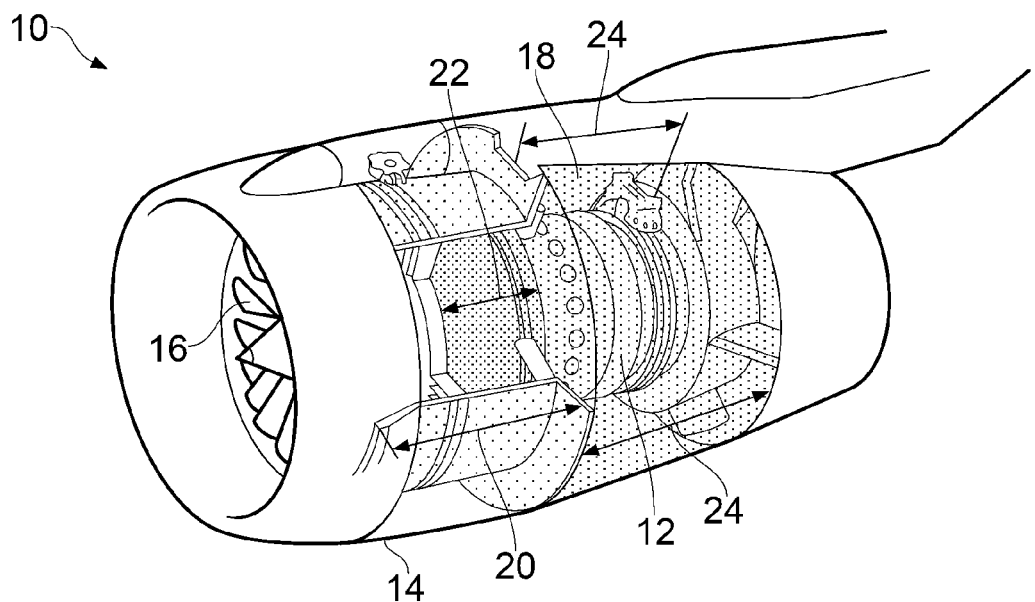
FIG. 2 shows a three dimensional view of the gas turbine engine of FIG. 1.
Figure 3A:
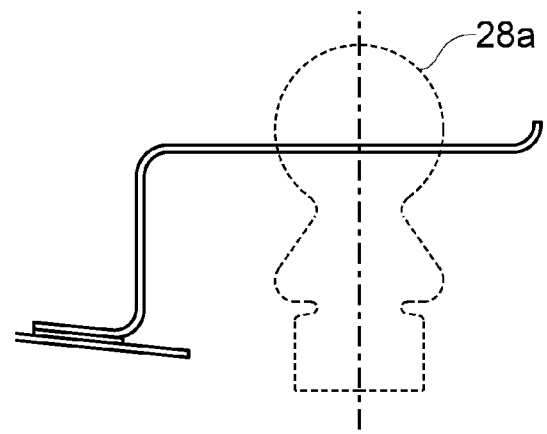
FIGS. 3a to 3c show section views through a seal assembly according to the prior art.
Figure 3B:
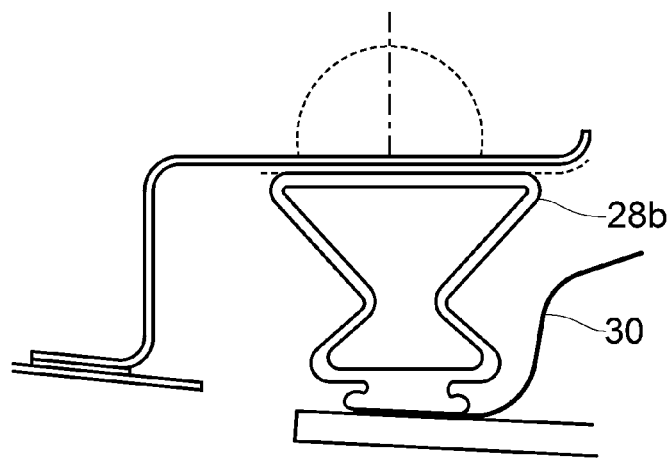
Figure 3C:
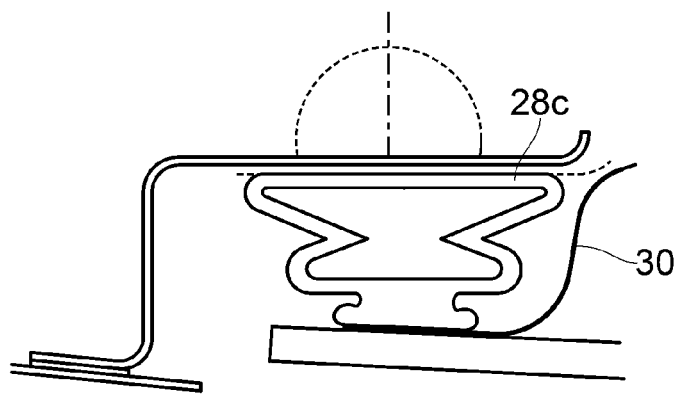
Figure 4:
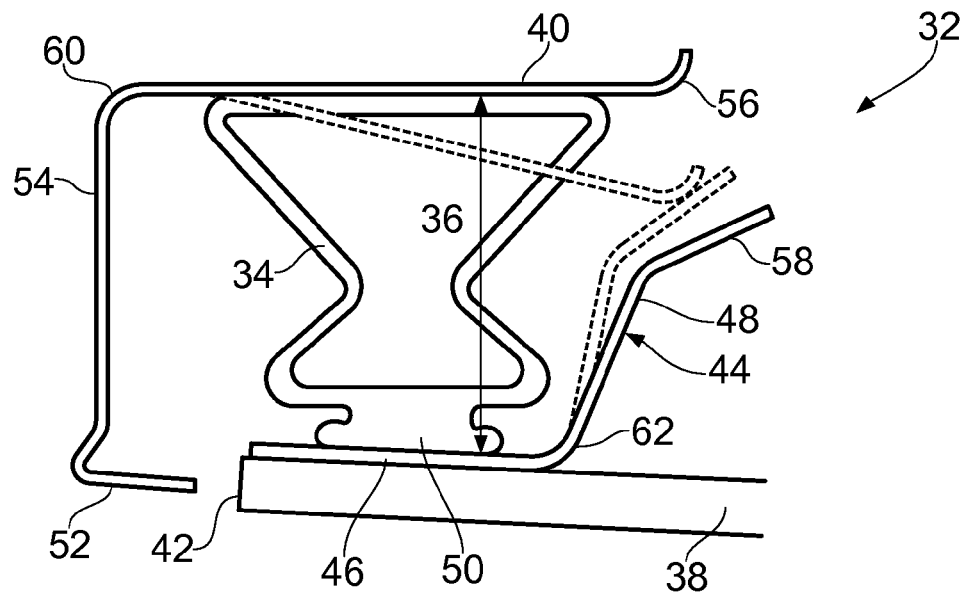
FIG. 4 shows a section view through a seal assembly according to a first example of the invention.

In the example of FIG. 4, a seal assembly 32 comprises a seal member 34 provided in a gap 36 between a support member 38 and an opposing seal land 40. In the particular example shown, the support member 38 comprises a wall defining a portion of a bypass duct 18 in a gas turbine engine, more specifically an annular outer wall of the bypass duct. The wall may be a radially inner wall of a nacelle 14 surrounding a core engine 12 as shown in FIG. 1.

The seal support 38 has a terminal end 42, adjacent which the seal member 34 is mounted. The seal member 34 is fixedly attached to the support 38 and upstanding therefrom.

In this example, the seal member 34 is attached to the support via an intermediate member 44, which takes the form of a shielding wall for the seal member. The seal member may thus be seated on a portion of the shielding wall which is in turn fixed to the support member. In this example, the shielding wall 44 comprises an extension or attachment portion 46 which is angled relative to an upstanding shielding portion 48. The attachment portion 46 lies flat against the adjacent portion of the support 38.

The seal member 34 is elongate in form, being shown in cross section in FIG. 4, and may extend about the annulus of the support 38, e.g. in a ring-like manner. The seal member 34 may take the form of a complete annulus itself or else a portion thereof. For example, multiple seal members 34 could form a substantially complete annulus, or part thereof, when mounted in an end-to-end arrangement. In other applications a linear elongate seal member 34 and correspondingly shaped support structure and seal land may be used.

The seal member 34 is formed of a resilient polymer material, typically of a conventional type for such an application, for example such as a natural or synthetic rubber, elastomer or other resinous material.

The seal member 34 has a cross sectional profile, which is typically constant long its length, defining a height dimension that is greater than its width, at least when the seal member is in an undeformed condition. The height of the seal is typically greater than the height of the gap 36. An omega seal is used in this example. An O-ring seal, or other convention seal profiles could be used in other examples of the invention. The omega seal provides particularly good compression characteristics in the scenario of FIG. 4.

The seal member 34 has a foot or base formation 50 by which it is mounted.

The seal land 40 comprises a wall portion opposingly spaced from the support 38. In this example the seal land 40 depends from a further/mounting wall portion 52 which may be generally flush with the support member 38. The two walls 38 and 52 may be arranged in an adjacent or end-to-end configuration and are typically spaced by a small distance. The wall portion 52 may comprise a further wall portion of a common duct with the support 38, in this example, the bypass duct 18. The wall portion 52 is mounted to, or integrally formed with, a further structure of the engine (not shown in FIG. 4).

The seal land 40 and support 38 comprise the opposing ends of two separate assemblies in this example, such that the exact height of the gap 36 is not known in advance and is subject to the compound tolerances of the components of the adjacent assemblies.

The seal land 40 extends in a direction substantially parallel with the support 38, which is a generally longitudinal direction with respect to the engine axis in this example.

The seal land 40 is integrally formed with the wall portion 52. An intermediate portion 54 of that member spaces the seal land 40 from the wall portion 52 and is generally perpendicular to the land 40. The component may be defined as a shaped wall, for example having a wall thickness that is significantly smaller (e.g. of an order of magnitude, or more, smaller) than the length and/or width dimension of the land.

The seal land 40 is turned away from the support 38 to form a lip or rim along its terminal edge.

The shield 48 is shorter in height than the seal member 34 and/or gap 36. The shield is formed as a shaped wall, for example having a wall thickness that is significantly smaller (e.g. of an order of magnitude, or more, smaller) that its length or width dimension.

The shield 48 is upstanding from the support 38 but is obliquely angled relative thereto, typically by an angle of greater than 45°. The edge of the upstanding portion is angled away from the seal 34 and land 40, so as to form a lip or rim at its free edge.

Either or both of the seal land 40 and shield 44 comprise a deformable material to allow selective actuation to protect or enhance the seal in adverse conditions. In this example, either or both of the seal land 40 and shield 44 comprise a shape memory alloy so as to cause reversible deformation of those components in a controlled/predictable manner upon heating. This is achieved by a phase change from martensitic to austenitic phase upon heating, thereby causing internal stress in the material in order to bring about the desired actuation/deformation. In this manner the land 40 and shield 48 can be arranged to allow a tolerance therebetween when mounted, and in normal operation condition, but can be tailored to close a gap therebetween during adverse conditions, such as in a fire.

The shield 48 and/or land 40 may be formed of nickel-titanium (NiTi) or similar.

The actuated condition of the seal land and/or shield is shown in phantom in FIG. 4. In particular, the actuated condition is brought about by a pivoting deformation of either or both of those components about corner 60 and/or 62.

The trigger temperature for actuation of the land/shield is selected to be above the normal operation temperatures for the seal assembly but below normal fire temperatures.

The use of SMA material is particularly advantageous as it offers superior fire resistance without increasing the mechanical complexity of the seal assembly. In other examples it is possible that an actuation mechanism could be implement, for example under the control of a controller, but it is in many ways preferred that the inherent properties of an SMA can produce the desired actuation without such complexities.

The deformation of the seal land and shield not only has the effect of providing a more complete shield for the entire height of the seal but also has the benefit of compressing the seal member 34 to reduce its height (along with the gap 36 height) upon actuation. This added benefit is important because the seal load at minimum compression during normal operation is critical to passing a fire test and accordingly the present invention allows a more optimal seal to be implemented that does not need to be over-sized or stiffened to achieve fire safety. The seal profile can thus be designed to operate under a reasonable amount of compression in normal use without developing high forces.

The deformation of the shield limits the size of any opening through which a flame can access the seal to thereby avoid jeopardising the structural integrity of the seal.

Figure 5:
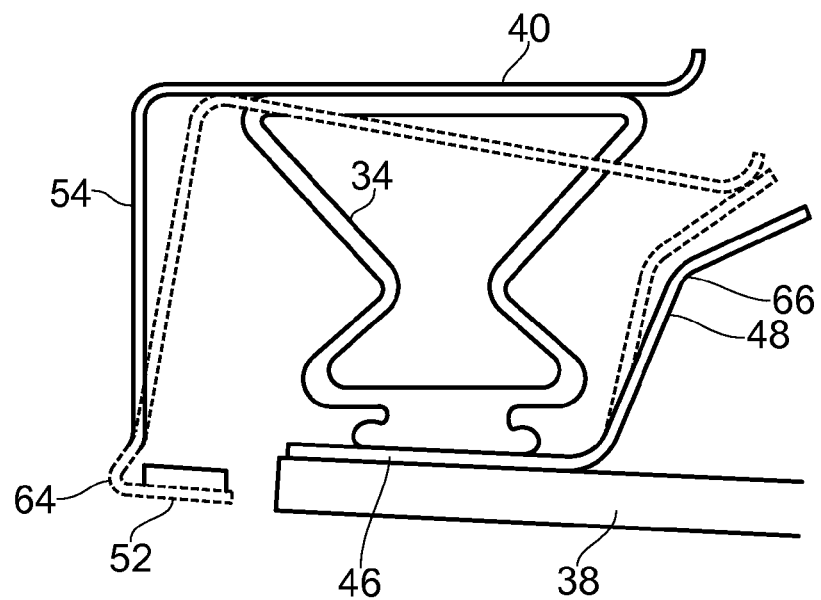
FIG. 5 shows a section view through a seal assembly according to a second example of the invention.
Figure 6:
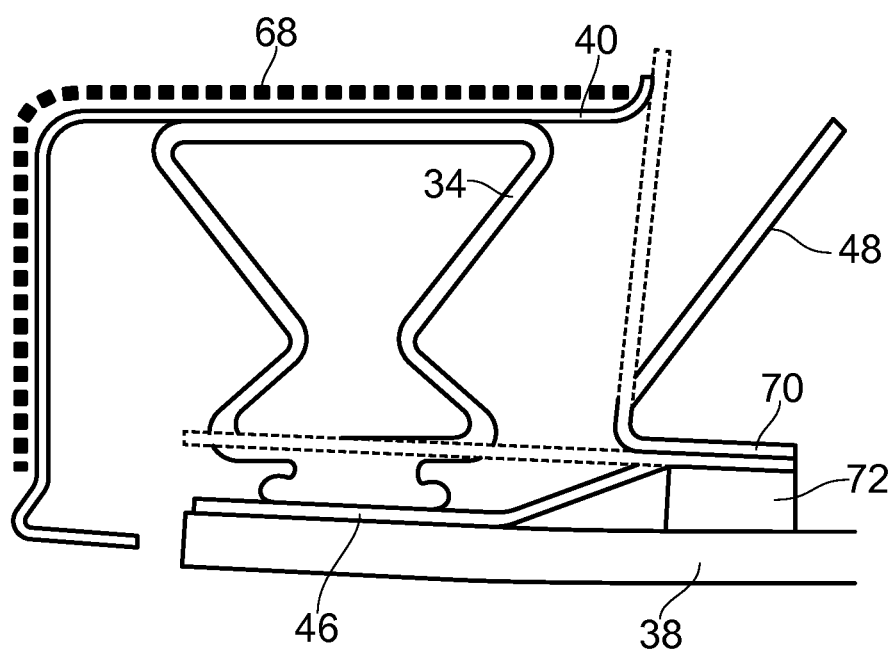
FIG. 6 shows a section view through a seal assembly according to a third example of the invention.

Turning now to FIGS. 5 and 6 the general arrangement of those examples is substantially as described above and like features will not be repeated for conciseness. The different features proposed by those examples are discussed below.

In FIG. 5 the seal land 40 is configured to deform/rotate about a corner 64 in addition to, or instead of, corner 60. The corner 64 is adjacent the supported end/wall 52 of the seal land. Whilst this provides a viable alternative to the embodiment of FIG. 4, it is generally preferred that a point of actuation is closer to the source of a fire in order to improve the reaction time of the assembly. Thus in FIG. 4 the corner 60 may be less attractive as it would require conduction of heat along the seal land 40 in order for actuation to occur, thereby incurring a possible time delay. Furthermore the corner 60 may be cooled by the bypass flow. In one example seal land could be actuable about both corners 60 and 64.

Also, in other examples the shield could be actuable about a point/corner 66 located part way up the height of the shield 48. This could be applied to the example of any of FIGS. 4 to 6 and would have the advantage of bringing the actuation location closer to the vicinity of an internal fire, thereby decreasing potential actuation time and/or the time period over which the seal member 34 is exposed to excessive temperature.

In FIG. 6, the seal land 40 is provided with an insulating protective layer 68, which may take the form of conventional fire blanket/jacket material. Ceramic or insulating material may be applied to the outer surface of the land 40. This feature may be used in any example of the invention and is not exclusive to the arrangement of FIG. 6. However it is considered most practical if such an insulating material is applied to a static, rather than actuable, portion of the seal land, where possible. The insulating material may help extend the life of the seal in an excessive temperature scenario.

The entire seal land may be static in FIG. 6 and may be formed of a conventional metal, rather than an SMA. Alternatively, the insulating material could be applied to a majority of the land 40, whilst still allowing actuation of the land 40 about corner 64 as shown in FIG. 5.

In FIG. 6, the geometry of the shield 44 has been modified to allow actuation of either or both of the mounting portion 46 and upstanding shield portion 48. In this example, the mounting portion 46 and shield portion 48 could be provided as a single component or as two components attached together at a fastening portion 70. Whilst the shield portion is shown as being straight in this example, it could otherwise be shaped and/or actuable as described above in relation to FIGS. 4 and 5.

The actuation of the mounting or base portion 48, i.e. the portion to which the seal member is attached, allows compression to be applied to the seal member 34 in addition to or instead of the flame shield 48 actuation. In another embodiment of the invention, the shield 48 could be static/non-actuable (e.g. formed of a conventional metal or other material rather than an SMA) but the additional seal compression provided by the portion 46 could help to improve fire resistance, albeit to a potentially lesser extent than the combined actuation example shown in FIG. 6.

The mounting portion 46 and/or shield 48 are mounted to the support 38 by a spacer or pedestal 72. The mounting portion 46 is shoed to lie flat along a portion of the support 38 beneath the seal member 34 in a normal mode of operation. However as the mounting portion is actuated, it moves away from the support 38 to an elevated condition and may be spaced from the support by the spacer 72. The common mounting of the mounting portion 46 and shield 48 to the spacer may ease the assembly of the seal. The spacer may also help to achieve a more linear, rather than rotational, compression of the seal member 34, more akin to normal compression loads.

In other embodiments, the spacer could be omitted and the mounting portion could be attached directly to the support 38 by a fixing, whereby the mounting portion could be actuated to turn away from the support at a desired location.

The example of FIG. 6 may act quickly in the event of a fire since all actuable components are on the internal/cavity side of the seal. Furthermore all of the actuable components are mounted to a common support, which means that all the relevant actuable components can be designed and assembled by a single component manufacturer. This avoids the need to coordinate the desired tolerances between multiple component suppliers, which can result in uncertainty in the gap height of the final assembly.

Whilst shape memory alloys have been proposed above, at least in part due to their self-actuable properties upon heating/cooling, it is to be noted that other deformable materials could be used. For example, it is possible that another shield or support material may be used that is deformable in a controlled manner upon heating. In any example, a non-reversible deformation may be viable, for example such that repair or replacement of the seal would be required after a fire event.

The above examples indicate specific locations in which the seal land or shield may be actuable in accordance with examples of the invention. However it will be appreciated that other shapes and deformation locations could be envisaged. The desired actuated shape will typically be defined by an austenitic profile of the relevant component during manufacture. In one example, a concertina or other extendable form of the seal land or shield could be provided to provide a linear actuation motion and/or compression loading on the seal member 34.

I claim:

1. A seal assembly comprising:
   a support structure to which a resiliently deformable seal member is mounted; and
   a seal land opposingly spaced from the support structure to define a gap therebetween, the height of the seal member in an undeformed condition being greater than the height of the gap such that the seal member is deformingly pressed against the seal land by the support structure to seal the gap therebetween,
   wherein the support structure and/or seal land comprise an actuable member that comprises a shape memory material, said actuable member being actuable in response to an adverse condition so as to move in a direction towards the other of the support structure and seal land to improve the resistance of the seal assembly to the adverse condition.

2. A seal assembly according to claim 1, wherein the actuable member comprises a protective wall arranged to one side of the seal member, such as a heat and/or flame shield.

3. A seal assembly according to claim 2, wherein the protective wall depends from a first one of the support structure and seal land at least part way across the gap towards the other of the support structure and seal land and is curved or angled in a direction away from the seal member in an un-actuated condition.

4. A seal assembly according to claim 1, wherein the actuable member has an at-rest condition and an actuated condition, the actuable member being deformed in shape upon actuation between said conditions.

5. A seal assembly according to claim 4, wherein the actuable member contacts the other of the support structure and seal land in the actuated condition.

6. A seal assembly according to claim 1, wherein the actuable member is selectively and/or reversibly actuable towards the other of the support structure and seal land.

7. A seal assembly according to claim 1, wherein the actuable member is pivotably actuable so as to alter the height of the gap between the seal land and support structure.

8. A seal assembly according to claim 1, wherein the actuable member is self-actuable in response to the adverse condition.

9. A seal assembly according to claim 1, wherein the actuable member is arranged to compress the seal member in response to the adverse condition.

10. A seal assembly according to claim 9, wherein the seal member is attached to the actuable member and the actuable member is mounted to the support structure.

11. A seal assembly according to claim 1, comprising a plurality of actuable members, a first actuable member of which comprises a protective wall to one side of the seal member and a second actuable member of which comprises a seal member actuator.

12. A seal assembly according to claim 1, wherein any one or any combination of the actuable member, the seal member, the support structure and the seal land extends in a circumferential direction about an axis.

13. A seal assembly according to claim 1, wherein the seal member is located adjacent a terminal edge of the support structure and/or seal land, within a length of overlap between the support structure and seal land.

14. A seal assembly according to claim 1, wherein the seal land or support structure comprises a recess in which the seal member is received, for example towards a terminal edge thereof.

15. A seal assembly according to claim 1, wherein the seal member is upstanding in section and may be generally omega shaped.

16. The seal assembly according to claim 1, wherein the adverse condition is a condition that could jeopardize the integrity of the seal member.

17. The seal assembly according to claim 16, wherein the adverse condition is fire.

18. A gas turbine engine comprising a seal assembly according to claim 1 for sealing an internal cavity thereof.

19. A seal assembly support structure, comprising:
    a support member to which a resiliently deformable seal member is mounted, the support member being opposingly spaced in use from a seal land to define a gap therebetween, the height of the seal member in an undeformed condition being greater than the height of the gap such that the seal member is deformingly pressed against the seal land by the support member to seal the gap therebetween; and
    an actuable member comprising a shape memory material and depending from the support member at least part way across the gap towards the seal land in use, said actuable member being actuable in response to an adverse condition so as to move in a direction away from the support member to improve the resilience of the seal member to the adverse condition.

* * * * *